No. 663,557. Patented Dec. 11, 1900.
D. BAKER.
PYROMETER.
(Application filed Apr. 20, 1899. Renewed Nov. 8, 1900.)
(No Model.) 3 Sheets—Sheet 1.

No. 663,557. Patented Dec. 11, 1900.
D. BAKER.
PYROMETER.
(Application filed Apr. 20, 1899. Renewed Nov. 8, 1900.)
(No Model.) 3 Sheets—Sheet 3.

Witnesses
Sidney P. Hollingsworth
F. S. Elmore

Inventor
David Baker
By P. J. Dodge
Attorney

THE NORRIS PETERS CO., PHOTO-LITHO., WASHINGTON, D. C.

UNITED STATES PATENT OFFICE.

DAVID BAKER, OF CHICAGO, ILLINOIS.

PYROMETER.

SPECIFICATION forming part of Letters Patent No. 663,557, dated December 11, 1900.

Application filed April 20, 1899. Renewed November 8, 1900. Serial No. 35,881. (No model.)

*To all whom it may concern:*

Be it known that I, DAVID BAKER, of Chicago, county of Cook, and State of Illinois, have invented a new and useful Improvement in Pyrometers, of which the following is a specification.

This invention has reference to the measurement of excessively high temperatures, such as exist in furnaces, ovens, hot-blast pipes, and other localities; and the invention consists of an improved method of measuring such temperatures.

The invention is based on a computation derived from a comparison of the pressures or temperatures of a fluid before and after it is exposed to the temperature to be measured, and while I prefer to employ steam as the fluid of measurement, mainly on account of the fixed and known relations of its temperature and pressure, it is to be understood that my invention is not necessarily confined to the use of steam, but comprehends the use of other fluids or gases.

In my method dry steam at a known and constant pressure is introduced into a chamber exposed to the temperature to be measured and after its passage through the chamber is mixed with a known quantity of steam at a known pressure, after which the temperature of this mixture is measured and the temperature of the exposed chamber determined by a comparison of the pressure or temperature of the steam entering the chamber with the temperature of the mixture.

The apparatus by which the above is effected comprises a separator for separating the moisture from the steam to produce dry steam, a pressure-regulator for maintaining the steam in the separator at a constant and uniform pressure, a chamber in which the dry steam is exposed to the temperature to be measured, means for mixing the steam after its passage through the chamber with a known quantity of steam at a known pressure, and a mechanism for measuring the temperature of the mixture.

Figure 1:
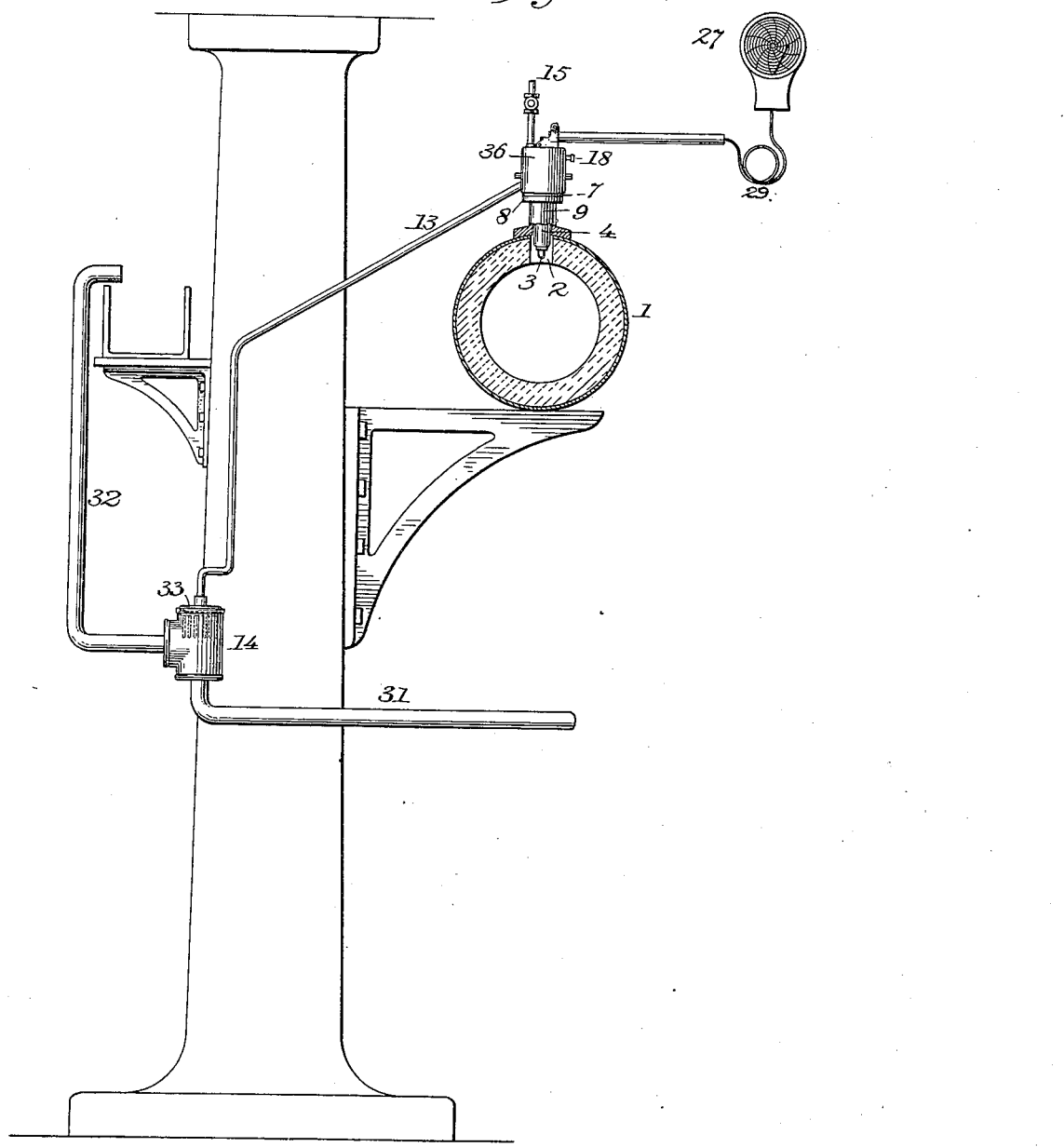
Figure 2:
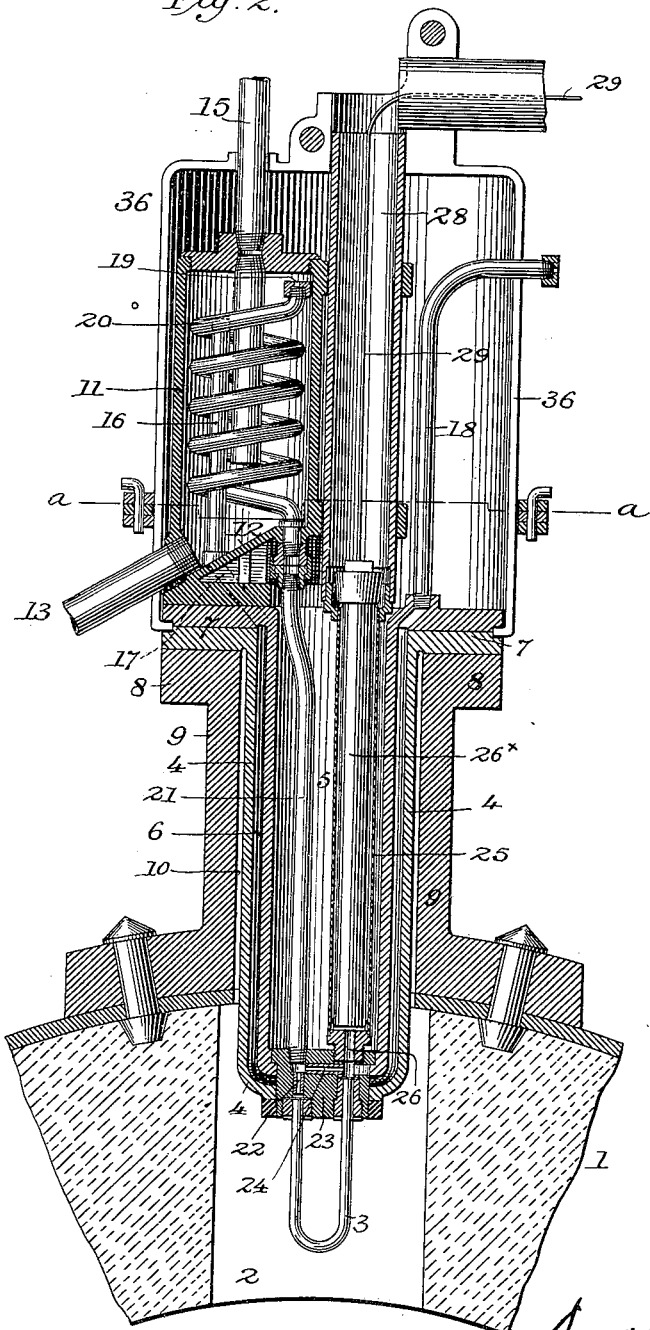
Figure 3:
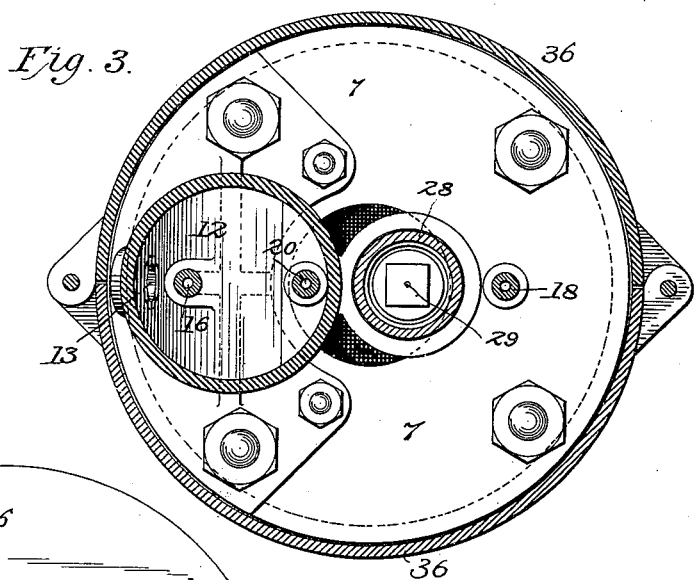
Figure 4:
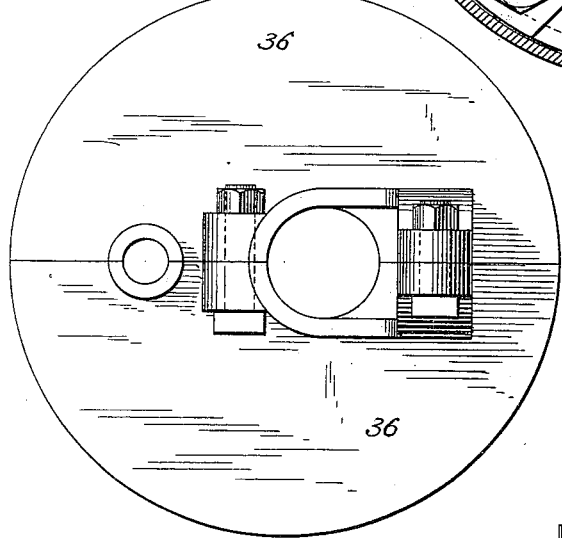
Figure 5:
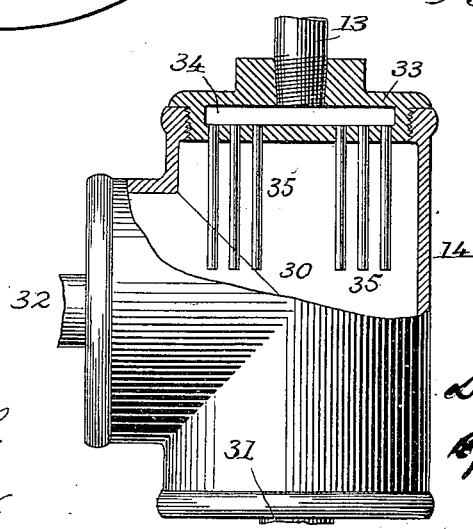

In the accompanying drawings, Figure 1 is an elevation of my improved pyrometer applied to a hot-blast main. Fig. 2 is a longitudinal vertical section, on an enlarged scale, the pressure-regulator being omitted. Fig. 3 is a horizontal section on the line $a$ $a$ of Fig. 2. Fig. 4 is a top plan view of the device. Fig. 5 is an elevation, partly in section, of the condensing-chamber of the pressure-regulator.

In the drawings I have shown the apparatus applied to a bustle-pipe or hot-blast main 1, which is open at 2 and into which opening projects a bulb 3 in the form of a loop of platinum tube, through which the dry steam is passed and where it attains the temperature of the interior of the main. The platinum tube is fixed to the inner end of a casing 4, having a central chamber 5 and an annular surrounding passage 6, closed at the top and bottom. At its outer end the casing is provided with a flange 7, seated on and secured to a flange 8 on the outer end of a surrounding casting 9, bolted at its inner end to the main. The casing is less in diameter than the interior of the casting, so that the annular space 10 is left between them.

Seated on the flange of the casing at its front is a vertical cylindrical chamber 11, which I term the "separator," in which saturated steam from any suitable source is introduced and the moisture separated therefrom. The chamber is formed with an inclined bottom 12 for the discharge of the water of condensation, which flows into an inclined pipe 13, entering the chamber at the side and extending downward, as shown in Fig. 1, with its lower end connected to a pressure-regulator 14 for maintaining a constant pressure of steam in the separator, as more fully described hereinafter.

Steam enters the separating-chamber through a vertical pipe 15, extending through the top of the chamber and downward therein and terminating near its bottom. A considerable portion of the moisture of the steam is deposited in the separating-chamber by reason of the fact that in entering this chamber it expands and its pressure increases, and by the well-known natural action it becomes superheated and evaporates part of the water held mechanically by the steam, and this passes, with the main portion of the steam, outward through the pipe 13. Of the remaining steam in the separator a portion enters a vertical pipe 16 therein, which communicates at its lower end through an opening 17 with the upper end of the annular chamber 6 in the casing 4, and the steam circulates through this chamber and leaves the same by a pipe 18, connected to the annular chamber at the opposite side, the purpose of which will be presently described. The remaining steam in the separating-chamber, which contains less moisture, enters the contracted opening 19 in the upper end of a coil of pipe 20, arranged vertically in the chamber, its upper end being near the top of the chamber, so that it receives the steam from the upper part of the chamber. At its lower end the coil communicates through the bottom of the casing with the upper end of a pipe 21, which extends longitudinally along the central chamber in casing 4 to its inner end, where it communicates with one end of the platinum pipe 3 through an opening 22 in a plug 23, in which the platinum pipe is fitted, which plug forms the inner end of the casing.

The platinum pipe is of a length sufficient to permit the fluid passing through it to acquire the temperature of the chamber the heat of which is to be measured. If this is not done, the coating up of the exposed chamber will change the conductivity of the metal composing it and correspondingly change the readings, thus rendering the instrument inaccurate.

The steam entering the contracted opening in the upper end of the coil of pipe expands in said pipe and is again superheated, and the remaining traces of moisture are effectually removed, and any superheating in this coil above what may be required to evaporate the last traces of suspended water is removed by conduction from the walls of the coil, so when the steam emerges from the coil it is dry and of the same temperature as the steam in the separator, which is constant, because the pressure is there held constant by the pressure-regulator 14, before alluded to. It is seen, therefore, that the action of the separating-chamber is to produce absolutely dry steam at a constant temperature and pressure.

The discharge end of the platinum loop communicates through a lateral passage 24 in the plug with the inner end of pipe 21, so that the steam which passes through the loop will unite and form a mixture with a portion of the steam from pipe 21. The passage 24 is of a known length and diameter, and the steam entering the same from pipe 21 is of a known pressure. The mixture enters the lower end of a tube 25 through a passage 26, which tube extends longitudinally in the central chamber 5 alongside the pipe 21 and incloses a bulb 26ˣ of a well-known Bristol recorder 27, Fig. 1. The steam flows around this bulb and leaves the top of the tube 25, where it enters the lower end of a cylindrical casing 28, extending alongside the separating-chamber, and opening at its upper end to the atmosphere. Within this casing the capillary tube 29 of the recorder extends, its lower end being connected to the upper end of the bulb, and its other end extending to the recording-pointer.

The bulb 26 is unaffected by any changes in the atmospheric temperature by reason of the fact that it is wholly surrounded by the annular passage 10, through which steam from the separator passes at a constant and uniform temperature.

The pressure-regulator 14 for maintaining a constant pressure in the separating-chamber, operates on the principle of the condensation of the excess of steam issuing from pipe 13 from the separator. As shown more particularly in Figs. 1 and 5, the regulator comprises a condensing-chamber 30, through which cold water is circulated, entering the chamber by a pipe 31 at its lower end and discharging through a vertical pipe 32 of a known and fixed height, so that a constant and known pressure in the condensing-chamber is maintained. In the upper end of the condensing-chamber is screwed a cover 33, containing a horizontal space 34, with which the pipe 13 from the separator communicates, and extending downward from this space 34 are a series of small pipes 35, terminating below the water-line. If now the pressure of steam as it enters the separating-chamber is reduced, but little will be discharged from the pipes 35 into the condenser and but little condensation will take place; but if the pressure rises more steam will issue from the pipes 35 but will be immediately condensed, and in this way the steam in the separating-chamber will be maintained at a constant and uniform pressure.

The provision of a series of small depending tubes entering the condensing-chamber is advantageous in that it prevents a sudden rushing of water into the tubes when the condensation takes place, which action would cause the pressure in the chamber to fluctuate violently.

The separating-chamber and adjacent parts are inclosed in a cylindrical casing 36, and the internal space may be packed with mineral wool or analogous material.

The operation of the apparatus is as follows: The steam entering the separating-chamber is maintained at a constant pressure by the pressure-regulator, and the water of condensation and a portion of the steam will pass through the bottom of the chamber to the condensing-chamber. Some of the steam will enter pipe 16, and circulating around the annular passage 10 will prevent the changes in atmospheric temperature from affecting the Bristol bulb. The dry steam in the separating-chamber leaves the upper end of the chamber through the contracted opening in the coil of pipe, and after passing through the coil every trace of the remaining moisture is evaporated and the dry steam passes from pipe 21 to the inner end of the casing. Here it is divided, a portion flowing through the platinum loop and a portion through passage 24 and uniting. The mixture flows through pipe 25 and around the Bristol bulb and escapes through casing 28. The temperature of the steam flowing around the bulb is recorded on the dial, and the temperature within the main may be determined by a comparison of the pressure and temperature of the steam before it passes through the loop with the temperature recorded on the dial.

Having thus described my invention, what I claim is—

1. The method of measuring high degrees of heat which consists in extracting the moisture from steam, passing the dry steam through a chamber exposed to the heat to be measured permitting the steam to attain the temperature of this heat, mixing the steam after its passage through the chamber with a quantity of the dry steam not subjected to the heat to be measured, and finally determining the temperature of the mixture.

2. The method of measuring high temperatures which consists in extracting a portion of the moisture from saturated steam, maintaining the partially-dried steam at a constant and known pressure, subjecting a portion of the partially-dried steam to a further drying action to extract all the moisture and produce dry steam, exposing the dry steam to the temperature to be measured, permitting the same to attain this temperature, circulating the partially-dried steam in proximity to the dry steam after the latter has been exposed to the heat to be measured, maintaining the separation of the two; whereby the circulating partially-dried steam serves the double purpose of reducing the temperature of the dry steam and maintaining a constant surrounding temperature, and finally determining the resulting modified temperature of the dry steam.

In testimony whereof I hereunto set my hand, this 7th day of April, 1899, in the presence of two attesting witnesses.

DAVID BAKER.

Witnesses:
W. J. MELVIN,
H. E. N. STINE.